March 23, 1965 E. S. CISCO 3,174,402
LOOSE JAW COLLET
Filed May 24, 1963 2 Sheets-Sheet 1
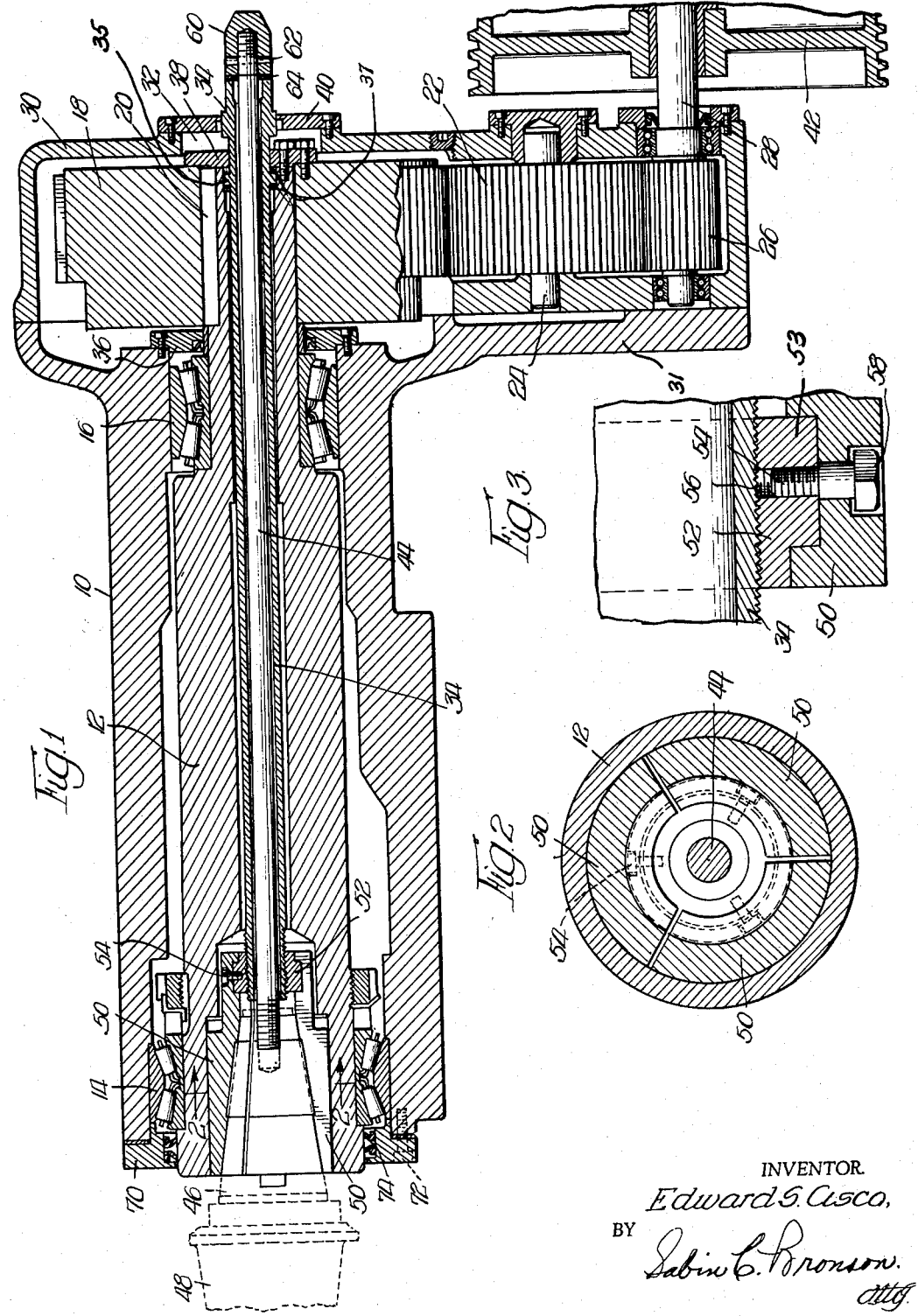
INVENTOR.
Edward S. Cisco,
BY
Sabin C. Bronson.
Atty.

March 23, 1965  E. S. CISCO  3,174,402
LOOSE JAW COLLET
Filed May 24, 1963  2 Sheets-Sheet 2
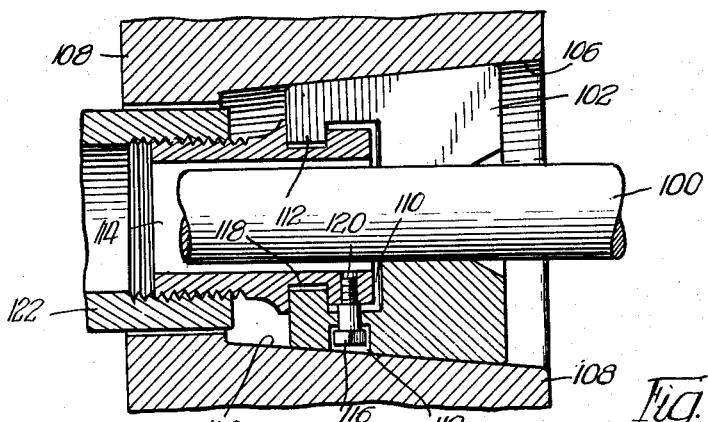
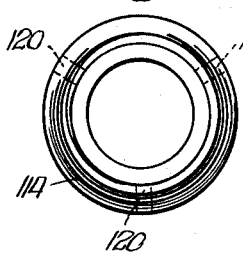
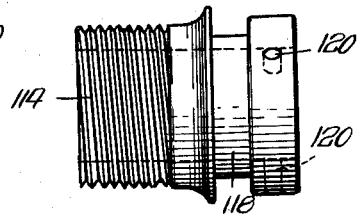
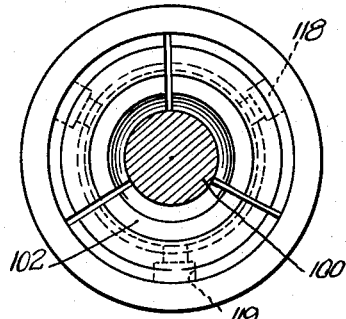
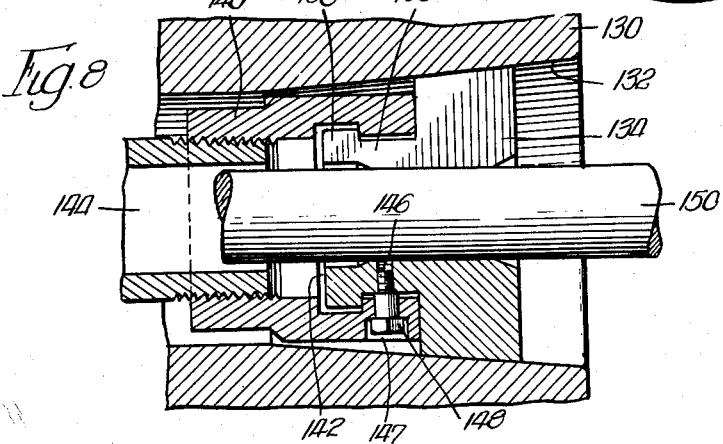
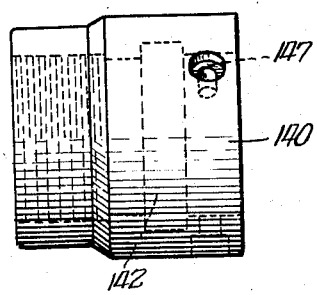
INVENTOR.
Edward S. Cisco,
BY Sabin C. Bronson.

United States Patent Office 3,174,402
Patented Mar. 23, 1965

3,174,402
LOOSE JAW COLLET
Edward S. Cisco, Highland, Ind., assignor to Stanray Corporation, Chicago, Ill., a corporation of Delaware
Filed May 24, 1963, Ser. No. 282,950
6 Claims. (Cl. 90—11)

This invention relates to machine tool elements generally, and particularly to an expandable multiple section collet for use in supporting or chucking work pieces having a tapered shank in machine tools and for other rotary clamping purposes. One modification of the invention relates to a collet formed of a multiplicity of parts for securely holding the tapered end of a cutter head in a spindle to practically eliminate vibration at the cutter head.

Heretofore the tapered shank of a cutter head has been tightly held by a spring type of collet in the bore of a spindle, which assembly is rotatably mounted in the arm of the machine. The force required to remove the cutter from the collet to free it from the spindle is quite high, and also considerable difficulty is experienced in drawing the cutter head into the collet and spindle tight enough to eliminate vibration, wear, etc.

Other modifications of the invention utilize the feature of the multiple part collet for clamping or chucking a work piece in machine tools or heads for rotary work.

It is therefore the principal object of the present invention to provide a collet having a plurality of sections so that said sections may expand radially with very little force after the tapered shank of the cutting tool is drawn into the collet, so that should wear occur in the meeting surfaces of the collet and spindle, the collet may be drawn tighter into the spindle to compensate for such wear.

One modification of the invention has particular application in a wheel truing machine such as illustrated and described in Patent No. 2,823,493 and is designed to hold a cutting tool of the type shown in Patent No. 2,645,003, both of these patents being owned by my assignee.

It is another object of the invention to utilize a multiple section collet in a machine tool provided with means to contract said sections about a work piece for rotary working thereupon.

Other objects and advantages of the invention will appear in the following description thereof.

Referring now to the accompanying drawing forming part of this application and wherein like reference characters indicate like parts:

FIGURE 1 is a longitudinal sectional view through the spindle arm of a wheel truing machine of the type shown in said Patent No. 2,823,493 and showing in dotted lines a portion of the cutter head held therein.

FIGURE 2 is a cross section on the line 2—2 of FIGURE 1.

FIGURE 3 is an enlarged sectional view through the ring for attaching the collet to the collet draw bar.

FIGURE 4 is a longitudinal cross sectional view of a modified form of collet for holding a bar or rod, for example, while being worked upon.

FIGURE 5 is a view of one end of FIGURE 6.

FIGURE 6 is a side elevation of the collet draw ring.

FIGURE 7 is an end view of the collet.

FIGURE 8 is a longitudinal cross sectional view of a still further modified form of collet for holding a bar or rod while being worked upon.

FIGURE 9 is a side elevation of the collet draw ring of FIGURE 8.

As will be seen in said Patent No. 2,823,493, the cutter heads are held in axially alined arms which form the upper part of a large C-frame, so that said frame, mounted in a pit under railroad tracks, may span railroad car wheel assemblies, one arm on either side thereof, and with the cutters directly under the wheel peripheries. In the drawing a C-frame arm (only one of which is illustrated as they are both identical) is indicated at 10. These arms are hollow cylindrical members, each of which rotatably supports therein a concentrically mounted rotatable hollow spindle 12. Between the forward ends of the arm 10 and spindle 12 is a spindle nose bearing 14, and between the rear ends of the arm and spindle is a spindle tail bearing 16. The spindle extends rearwardly beyond the arm 10 and has mounted thereon a geared fly wheel 18 by means of a fly wheel key 20. Meshing with the fly wheel 18 is an idler gear 22, mounted on idler shaft 24. A driving pinion 26 meshes with idler gear 22. Pinion 26 is mounted on drive shaft 28. This entire gear train is protected by a surrounding transmission cover 30. The arm 10 has integrally formed on the rear end thereof a depending wall 31 against which the periphery of the transmission cover abuts and is removably secured thereto in any desired manner. An opening 32 is formed in the cover 30 axially through which projects the rear end of the hollow cylindrical collet draw bar 34. The spindle 12 is stepped or reduced in external diameter adjacent the fly wheel gear 18 on which reduced portion the tail bearing 16 is mounted. The collet draw bar is located in the assembly by means of an integral collar 35 which projects into an enlarged diametered portion of the rear end of the spindle. On opposite sides of this collar are placed bronze thrust bearings 37, the rear one of which is split so that it is applied in two halves. The spindle 12 extends through the fly wheel and is held by a fly wheel retaining plate 38 which is split and surrounds the collet draw bar 34 removably secured to the end of the spindle 12. The diameter of the plate 38 is slightly less than the diameter of the opening 32 so that access to the plate 38 may be had through said opening. A housing cover plate 40 surrounds the draw bar 34 and is removably secured to the transmission housing to cover the opening 32.

The drive shaft 28 extends through the cover 30 and has a drive wheel 42 mounted thereon, to receive power from a source not shown, to drive the mechanism.

Within the collet draw bar 34 is mounted the cutter draw bar 44, which is an elongated shaft, having a screw-threaded forward end which screws into a screw-threaded axial bore in the end of the tapered shank 46 of the cutter head 48, indicated in dotted lines.

The internal diameter of the spindle 12 is stepped at its outer end and has mounted therein the three-part collet 50, also stepped in external diameter to fit the stepped bore of the spindle. A cylindrical ring or fitting 52 is screw-threadedly mounted on the outer end of the collet draw bar 34.

The outer surface of the ring 52 is stepped forming an annular embossment 53 thereon (see FIG. 3) which snugly fits within a similarly sized annular recess formed in the inner surface of the collet sections. Thus when the collet sections 50, and ring 52 are assembled within the spindle arm, there can be no longitudinal movement relatively between the collet sections.

The ring and collet are held together by shoulder screws indicated at 54, there being a shoulder screw 54 for each of the three sections of the collet. It will be noted that the threaded shank of the shoulder screws 54 screw into the threaded opening 56 (see enlarged view FIGURE 3) until the shoulder butts the external surface of ring 52. An opening slightly larger than and axially alined with the threaded opening 56 is provided through each collet section 50, and these communicate with still larger diametered openings 58 for the heads of the shoulder screws. Openings 58 are slightly larger than the screw heads, and to that extent the sections of the collet may radially expand on the screws. The only purpose of the shoulder screws 54 is to hold the collet parts together for assembly and disassembly as a unit into the spindle 12, but in so doing they must allow for radial adjustment of the collet sections.

The collet 50, fitting 52, and draw bar 34 are concentrically arranged, and the fitting interlockingly attaches the collet sections to the draw bar. Thus longitudinal movement of the tapered shank of the cutter is translated into radial movement of the collet sections against the spindle walls and clamps the work to the spindle.

The rear end of the cutter draw bar is screw-threaded and has mounted thereon the draw bar nut 60 which is locked in place on the end of the draw bar by the tapered pin 62. As before stated, the cutter shank is screw-threadedly mounted on the other end of the cutter draw bar. Thus when it is desired to adjust or tighten the cutter shank in the collet, the nut 60, which has a hex external surface, is turned clockwise which will screw the other end of the cutter draw bar 44 further into the cutter shank, pulling the cutter shank into the collet, and tighten the cutter in the collet. The collet can expand slightly to compensate for any wear in the spindle, within the limits of the clearance of the collet about the shoulder screws 54. By this adjusting means the cutter may be maintained tightly within the collet sections, which in turn are maintained tightly within the bore of the spindle, thereby eliminating vibration if, as and when it develops. When the cutter 48 is to be loosened, or removed for repair or the like, nut 60 is turned counter clockwise which will unscrew cutter draw bar from the cutter until there is a slight clearance between the nut 60 and end of collet draw bar 34. Then the end of the nut 60 may be tapped with a hammer which will free the cutter shank from the collet sections when the cutter may be easily unscrewed from the cutter draw bar.

Mounted on the outer end of the spindle arm 10 is the front spindle bearing cover, it being an annular ring 70 provided with a plurality of circularly arranged cap screws 72 screw-threadedly mounting the bearing cover ring 70 to the end of the machine arm 10. The inner surface of the ring 70 is stepped and has mounted therein annular resilient dust and oil seals 74 to protect the bearings from damaging foreign matter.

Now referring to the modification of the invention shown in FIGURES 4 to 7.

The principle of the expandable collet of the first modification is used in this modification. In this case the material to be worked upon may be a cylindrical shaft such as indicated at 100, one end of which is shown installed within the collet, indicated at 102. This collet is formed in three sections, which together form a complete cylinder around the work piece 100, the surface of the outer walls of which collet sections are tapered and fit within the correspondingly tapered inner surface 106 of a standard machine tool spindle 108. The assembled collet, in side elevation, has the appearance of a frustum of a cone. The smaller ends of the three-part collet is provided with an axial opening 110 which is T shaped in section providing a ring flange 112. A modified nipple like fitting 114 is provided for attachment to the end of the collet, it being screw-threaded at one end and has a T shape in section at the other end providing a circumferential recess 119 to snugly receive the flange 112 of the collet. In FIGURE 4, it will be noted, there is a slight clearance between the bottom of the recess and the flange 112 to allow a slight contracting radial movement of the collet sections in clamping onto the work bar 100.

The three sections of the collet are held rather loosely assembled to the nipple by means of three shoulder screws 116. The shoulder screws have a smooth shank adjacent the head with a smaller screw-threaded portion issuing axially from the end of the shank so that the juncture of the threaded portion with the shank forms a shoulder or abutment for the threaded portion, limiting its penetration into another part. Each section of the collet is provided with a stepped opening 119 extending into the opening 110, the shank of the screw fitting the smaller part of the opening 119, with the head of the screw within the larger part. A threaded bore 120 is formed in the nipple in axial alinement with the stepped opening 119 in each section of the collet so that when the collet is applied onto the nipple, the screws will hold the sections together for application as a unit within the tapered bore of the spindle 108.

The shoulders of the screws 116 limit the penetration of the screws into the nipple, and it will be noted that the head of screw 116 has a small clearance between it and the tapered surface 106 of the spindle 108 when the collet assembly is placed within the spindle. This clearance and that between the flange 112 and bottom recess 118 is provided to allow radial movement of the sections of the collet on the bolt shanks within the limits of the clearance. A pipe 122 is screw-threadedly mounted upon the threaded end of the nipple 114. The end of the shaft 100 or material to be worked upon is placed within the assembly of collet 102, nipple 114, and pipe 122, all within the spindle 108. The pipe 122 thus becomes a collet draw bar and by pulling on the pipe it will draw the collet toward the smaller diametered end of the tapered opening in the spindle, causing the sections of the collet to radially contract and thereby clamp down on the bar 100, holding same securely in the spindle during the working operation. When work on the bar is finished, the collet draw bar is unscrewed slightly from the ring. Then the outer end of the collet draw bar 122 may be tapped with a hammer or the like, which will loosen the tapered surfaces of the collet and spindle, and permit removal of the work piece 100.

Another modification of the invention is shown in FIGURES 8 and 9. In this modification the hollow spindle is shown at 130, it having a tapered bore therein as indicated at 132. The three part hollow collet in this instance is shown at 134 and comprises a composite having a tapered peripheral surface corresponding to the taper of the spindle bore 132. The forward approximate half of the collet sections is of reduced diameter as indicated at 136 and terminates collectively in an outwardly extending flange 138. The collet sections forming the collet 134 are held together by a modified coupling indicated at 140, it being provided with an internal annular recess 142 adjacent one end and being internally threaded at its other end. The flange 138 fits within the recess 142, and a collet draw bar 144, threaded at one end for application within the threaded end of the coupling, is provided. Thus the coupling connects the collet and the draw bar.

Each section of the collet is provided with a threaded opening 146, which is in axial alinement with a stepped opening 147 in the coupling, so that a shoulder bolt 148 may be applied into the stepped opening and screwed into the opening 146 to hold the sections of the collet together while being inserted into the spindle. The material to be worked upon is shown in this instance as a round bar or rod 150.

In this instance too, there is a clearance between the head of the bolt 148 and the tapered wall of the spindle so that the sections of the collet will radially expand and contract within the limits of the clearance as moved along said tapered wall.

It is thus obvious that the assembly shown in FIGURE 8, if the draw bar is pulled, will cause the collet sections to be drawn into the spindle along the tapered wall thereof, causing the collet sections to clamp on bar 150 and hold same securely in place while being worked upon.

From the foregoing it is evident that I have devised a simple means of providing a multiple section collet which is radially expandable or contractible for clamping a work piece or tool for rotatable operation.

Having thus described my invention, what I claim and desire to secure by letters patent is:

1. In combination, a rotatable hollow spindle, a multiple section cylindrical hollow collet within said spindle, to receive therein a work piece, a hollow fitting concentrically arranged within said collet sections and interlockingly engageable therewith, means radially movably holding each collet section to said fitting, a hollow collet draw bar within said spindle, said collet and fitting being mounted on said collet draw bar, said collet having tapering surfaces engaging correspondingly tapering surfaces of said work piece so that relative movement along said tapering surfaces will cause said collet sections to move radially and clamp said work piece, and means whereby longitudinal movement of said fitting will cause radial movement of said collet sections and clamp said work piece therein.

2. The combination of claim 1, wherein said last mentioned means comprises a draw bar attached to said work piece for moving the tapered surfaces relative to each other and causing radial movement of said collet sections.

3. In combination, a hollow spindle, a hollow multiple section collet, having inner tapering peripheral surfaces, said collet being installed within said spindle, and said sections being radially movable, a work piece within said collet, and means for moving said collet sections and said work piece in opposite directions longitudinally within said spindle to cause radial movement of said collet sections to clamp said workpiece within said spindle.

4. The combination set forth in claim 3, said means comprising a draw bar, and a fitting connecting said draw bar and said collet, and a work piece draw bar for moving the work piece within said collet.

5. The combination set forth in claim 3, said collet sections each being connected to said fitting by means on which said sections are radially movable.

6. In combination, a hollow spindle, a hollow multiple section collet, having tapered inner surfaces, installed within said spindle, a work piece within said collet, a fitting having an end portion interlockingly engaging said collet, each section of said collet being secured to said fitting by means on which said sections are radially slidable, and a draw bar screw-threadedly attached to said fitting for drawing the fitting and thereby the collet along the tapered surface of said work piece and causing the collet sections to contract about said work piece within the collet.

References Cited by the Examiner
UNITED STATES PATENTS

| | | | |
|---|---|---|---|
| 1,665,250 | 4/28 | Atkins | 279—58 |
| 2,562,455 | 7/51 | Gridley | 279—1.4 |
| 3,059,509 | 10/62 | Sofranko | 279—4 |

ROBERT C. RIORDON, *Primary Examiner.*